(12) United States Patent
Nakajima (10) Patent No.: US 10,137,524 B1
(45) Date of Patent: Nov. 27, 2018

(54) SPOT WELDING ELECTRODE HOUSING APPARATUS

(71) Applicant: KYOKUTOH CO., LTD., Nagoya-shi, Aichi (JP)

(72) Inventor: Kotaro Nakajima, Nagoya (JP)

(73) Assignee: KYOKUTOH CO., LTD., Nagoya-shi, Aichi (JP)

( * ) Notice: Subject to any disclaimer, the term of this patent is extended or adjusted under 35 U.S.C. 154(b) by 0 days.

(21) Appl. No.: 15/839,779

(22) Filed: Dec. 12, 2017

Related U.S. Application Data (63) Continuation of application No. PCT/JP2017/018174, filed on May 15, 2017.

(51) Int. Cl.
*B23K 9/28* (2006.01)
*B23K 11/10* (2006.01)
*B23K 11/36* (2006.01)

(52) U.S. Cl.
CPC .................................. *B23K 11/36* (2013.01)

(58) Field of Classification Search
CPC ....... B23K 11/31; B23K 11/36; B23K 11/312; B23K 11/315; B23K 11/317; B23K 11/318; B23K 9/28; B23K 11/10; B23K 9/24; B23K 11/30; H05B 3/03
USPC ........ 219/119, 86.21, 86.25, 86.33; 206/722, 206/723; 221/312 A–312 C
See application file for complete search history.

(56) References Cited

U.S. PATENT DOCUMENTS

2012/0118790 A1    5/2012    Braeuer

FOREIGN PATENT DOCUMENTS

| JP | S50-136664 A | 10/1975 |
| JP | H06-15886 U | 3/1994 |
| JP | 2013-514182 A | 4/2013 |

OTHER PUBLICATIONS

International Search Report and Written Opinion for PCT/US2017/018174 dated Jun. 13, 2017.

*Primary Examiner* — Michael G Hoang
(74) *Attorney, Agent, or Firm* — Womble Bond Dickinson (US) LLP; Joseph Bach, Esq.

(57) ABSTRACT

A pressing unit presses a plurality of electrodes housed in a housing path in a housing case toward an electrode outlet port. When a lever member swings to one side, a distal end of the lever member comes to be in a first position in which the lever member covers a part of the electrode outlet port. When the lever member swings to the other side, the lever member comes to be in a second position in which the distal end exposes the electrode outlet port. A first coil spring is disposed between a proximal end of the lever member and a first side surface portion of the housing case, and biases the proximal end of the lever member to a direction away from the housing case.

4 Claims, 7 Drawing Sheets

SPOT WELDING ELECTRODE HOUSING APPARATUS

CROSS-REFERENCE TO RELATED APPLICATION

This is a continuation of International Application No. PCT/JP2017/018174 filed on May 15, 2017, the entire disclosure of which is herein incorporated by reference.

BACKGROUND

The present invention relates to a spot welding electrode housing apparatus where an electrode for spot welding to be used in, for example, automobile manufacturing lines is housed so as to be mountable to a shank of a welding gun.

In conventional automobile manufacturing lines, a plurality of press molded products are joined by spot welding to assemble a vehicle frame, and the spot welding is generally performed using a welding gun attached to a front edge of an arm of an industrial robot.

An electrode is mounted to the shank of the welding gun by fitting the distal end of the shank in a fitting recess of the electrode. The electrode is worn out through repetition of spot welding, and thus, needs to be periodically exchanged with another one. Thus, in exchanging electrodes, to efficiently mount an electrode to the shank of the welding gun, a spot welding electrode housing apparatus is placed on automobile manufacturing lines.

For example, an electrode housing apparatus disclosed in Japanese Unexamined Patent Application Publication (Translation of PCT Application) No. 2013-514182 includes a square tubular housing case including a housing path therein, and the housing path can house electrodes in a state where the electrodes are arranged linearly in a direction orthogonal to the center axes of the electrodes and fitting recesses are arranged in parallel and are open in the same direction. An end of the housing case has an electrode outlet port communicating with the housing path, whereas the inside at the other end of the housing case is provided with a pressing unit that presses one or a plurality of parallel electrodes housed in the housing path against one end of the housing path by a spring force. On an end of the housing case, an ejection regulating member that is movable in a direction orthogonal to the longitudinal direction of the housing case is disposed. The ejection regulating member covers a part of the electrode outlet port when moved to one end by a biasing force of a coil spring to regulate ejection of an electrode from the electrode outlet port, and enables ejection of an electrode from the electrode outlet port when moved to the other side against a biasing force of the coil spring. When the shank distal end is fitted in a fitting recess of an electrode contacting the ejection regulating member in the electrodes disposed in parallel in the housing path and the shank distal end is moved to an end of the housing path, an electrode is ejected from the electrode outlet port that is exposed by movement of the ejection regulating member to the other side against the biasing force of the coil spring. Thereafter, an electrode adjacent to the ejected electrode moves to an end of the housing path by the spring force of the pressing unit, and contacts the ejection regulating member that has moved to one side by the biasing force of the coil spring so that ejection from the electrode outlet port is regulated.

SUMMARY

In Japanese Unexamined Patent Application Publication No. 2013-514182, since a biasing mechanism including a coil spring as a movable part is ejected sideways outward from the outer surface of the housing case. Thus, another equipment or tool accidentally contacts the biasing mechanism to prevent the ejection regulating member from moving, and thus, there might arise a problem that an electrode cannot be ejected from the apparatus.

In the electrode housing apparatus of Japanese Unexamined Patent Application Publication No. 2013-514182, the coil spring is exposed at the side of the housing case, and thus, the apparatus has poor appearance.

The present invention has been made in view of the foregoing drawbacks, and has an object of providing a spot welding electrode housing apparatus that does not easily malfunction and can have excellent design.

To achieve the object, the present invention has a feature in which the ejection regulating member is configured to have a lever shape that swings the ejection regulating member, and arrangement of the biasing part for biasing the ejection regulating member is devised.

Specifically, the present invention is directed to a spot welding electrode housing apparatus that can house a plurality of spot welding electrode, and provides solutions described below.

That is, in a first aspect of the present invention, a spot welding electrode housing apparatus includes: a housing case including a linear housing path therein and having an electrode outlet port, the housing path being capable of housing the electrodes in a state where the electrodes are arranged linearly in a direction orthogonal to center axes of the electrodes and fitting recesses of the electrodes to be fitted on a distal end of a shank of a welding gun are arranged in parallel and are open in an identical direction, the electrode outlet port communicating with the housing path and being disposed at an end of the housing case; a pressing part that presses one or a plurality of parallel electrodes housed in the housing path toward an end of the housing path; a lever member supported by the housing case to be swingable about a swing shaft extending in a direction identical to the center axes of the electrodes housed in the housing path, a position of the lever member being changeable between a first position in which the lever member swings to one side to have a distal end cover a part of the electrode outlet port and a second position in which the lever member swings to another side to have the distal end expose the electrode outlet port; and a biasing part disposed between a proximal end of the lever member and a side surface of the housing case and configured to bias the proximal end of the lever member to a direction away from the housing case so that the lever member swings to the one side.

In a second aspect of the present invention, in the first aspect, the housing case has a pin insertion hole in which a regulating pin is insertable, and the regulating pin is configured to prevent the lever member from swinging to the one side in a position between the first and second positions.

In a third aspect of the present invention, in the first or second aspect, a pair of projecting plate portions opposed to each other in a direction along the swing shaft and extending along the housing case is formed in a side surface of the housing case at one end, and the lever member is disposed between the pair of projecting plate portions.

In a fourth aspect of the present invention, in one of the first through third aspects, the spot welding electrode housing apparatus further includes: a bracket for attaching the housing case to an attachment object, wherein the bracket has an attachment recessed portion to which the housing case is attachable, the attachment recessed portion has a guide surface for guiding the housing case in attaching the housing case, one of the guide surface or the housing case has a guide groove extending along a direction of attachment of the housing case to the attachment recessed portion, and the other one of the guide surface or the housing case has a rib capable of being fitted in the guide groove.

In the first aspect, since the coil spring is disposed at a position of the lever member near the housing case, even if another equipment or tool contacts the apparatus, this equipment or tool contacts the lever member before contacting the coil spring as a movable member. This configuration can prevent a failure in moving the lever member due to direct contact of this equipment or tool with the coil spring. In addition, since the coil spring is not located on the outer surface of the lever member, appearance of the entire apparatus can be enhanced, and the apparatus can have excellent design.

In the second aspect, the lever member can be maintained in a state where the opening area of the electrode outlet port is larger than the opening area of the electrode outlet port while the lever member is in the first position. Thus, when an operator manually houses an unused electrode in the housing path of the housing case from the electrode outlet port, a load on fingers of the operator can be reduced, and thereby, housing of the electrode can be easily performed.

In the third aspect, since the lever member is sandwiched between the projecting plate portions, even if another equipment or tool contacts the apparatus, this equipment or tool contacts the projecting plate portions before contacting the lever member. This configuration ensures prevention of a problem that another equipment or tool accidentally contacting the lever member causes the lever member to move to another side so that an unused electrode in the housing path is moved out from the electrode outlet port by a pressing force of the pressing unit. In addition, since the coil spring is surrounded by the projecting plate portions, occurrence of failures due to attachment of foreign matter or the like to the coil spring can be reduced.

In a fourth aspect, when the rib is matched with the guide groove and the housing case is moved along the rib, the rib is fitted in the guide groove and the housing case is attached to the attachment recessed portion of the bracket. Thus, the process of attachment of the housing case to the bracket is easily performed, and the housing case can be accurately positioned relative to the bracket.

DETAILED DESCRIPTION

An embodiment of the present invention will be described in detail with reference to the drawings. The following embodiment is merely a preferred example in nature.

Figure 1:
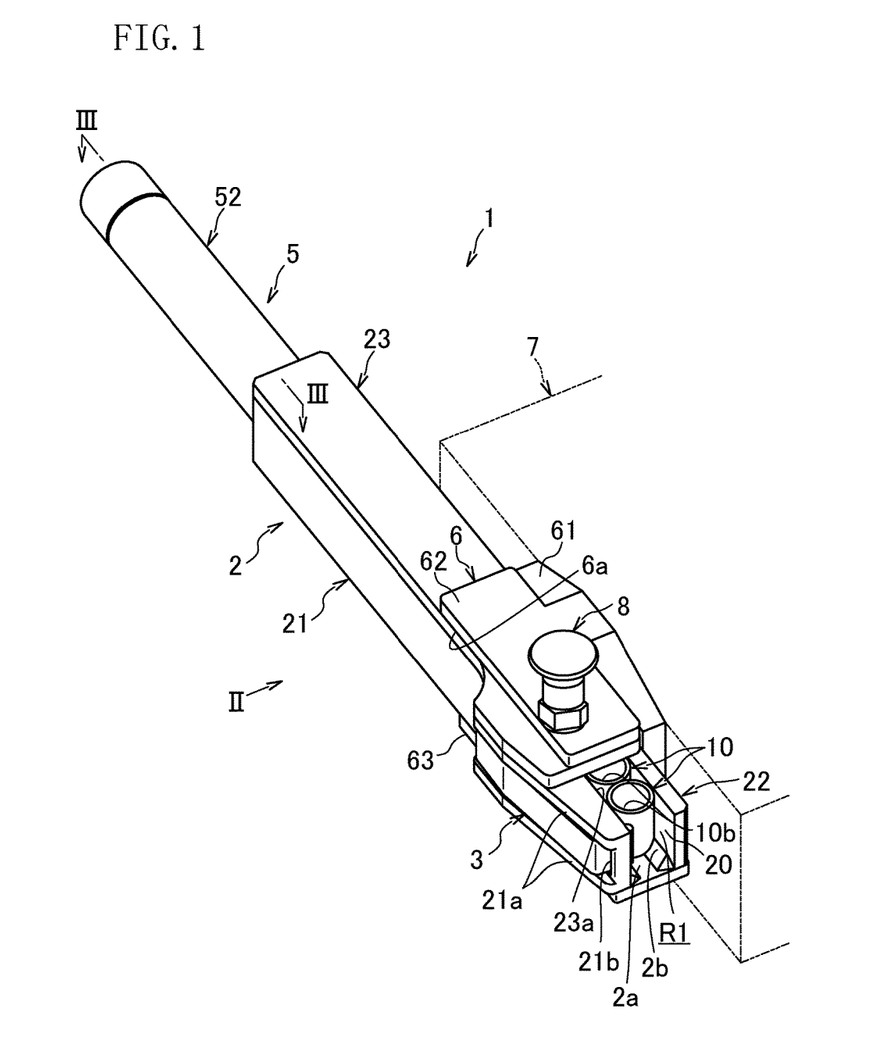
FIG. 1 is a perspective view of a spot welding electrode housing apparatus according to an embodiment of the present invention.
Figure 2:
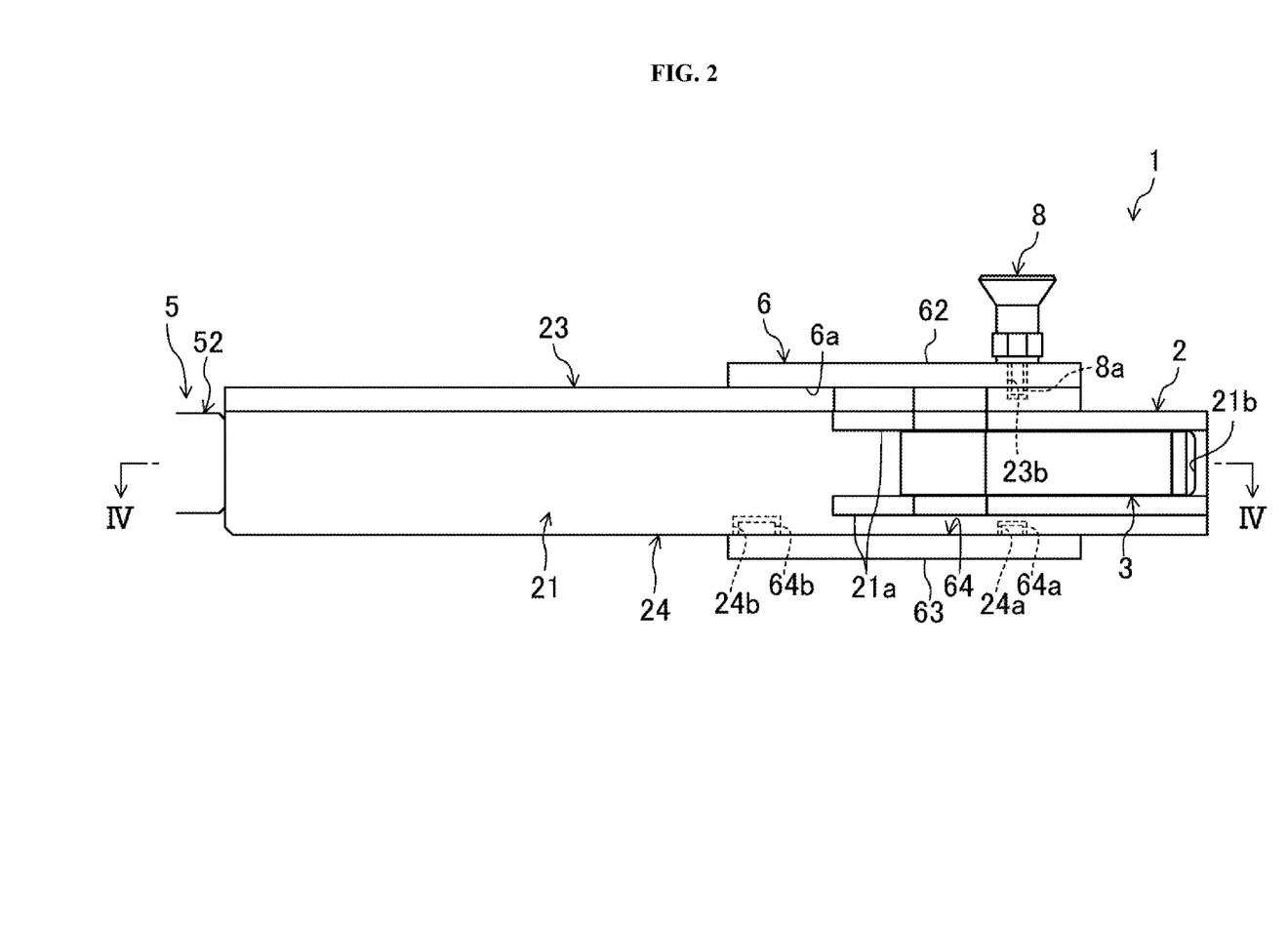
FIG. 2 is an arrow view when viewed along arrow II in FIG. 1.

FIGS. 1 and 2 illustrate a spot welding electrode housing apparatus 1 according to an embodiment of the present invention. This electrode housing apparatus 1 is disposed at a side of an automobile body assembly path in an automobile manufacturing line, and houses a plurality of spot welding electrodes 10 in a position that can be mounted to a shank 11 (see FIG. 5) of a welding gun held by a welding robot.

The electrode housing apparatus 1 includes a substantially square tubular housing case 2 extending linearly in the horizontal direction. The housing case 2 includes a first side surface portion 21 and a second side surface portion 22 that are opposed to each other in the horizontal direction orthogonal to the longitudinal direction of the housing case 2, a surface portion 23 connecting upper edges of the first side surface portion 21 and the second side surface portion 22 together, and a back surface portion 24 connecting lower edges of the first side surface portion 21 and the second side surface portion 22 together.

Figure 5:
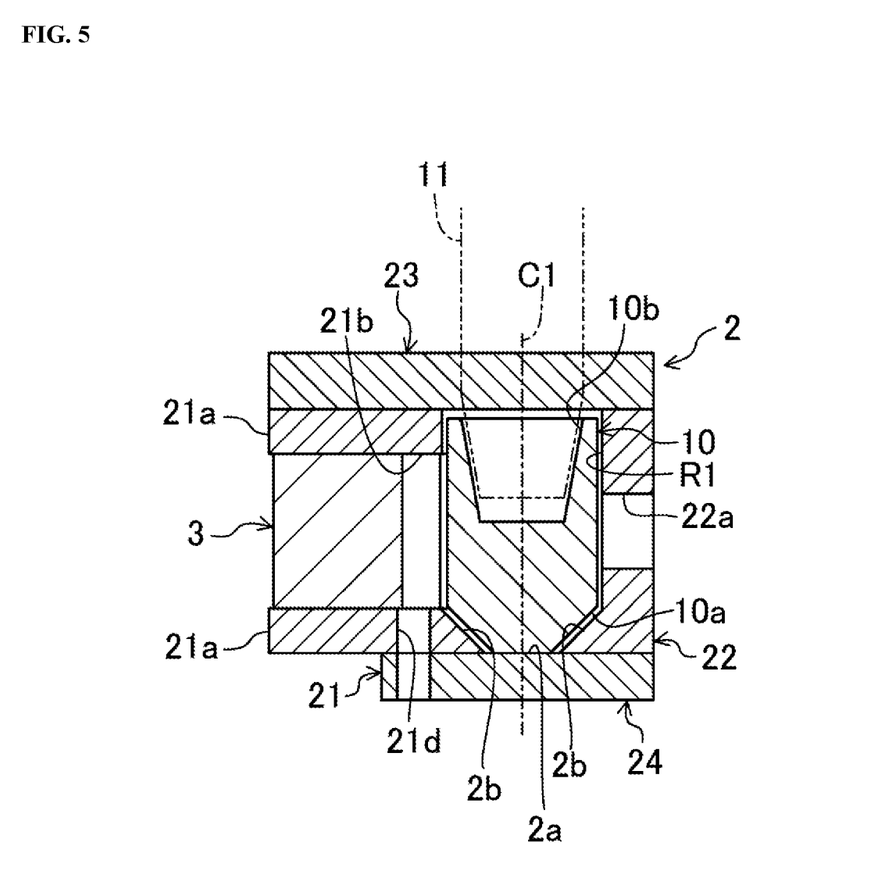
FIG. 5 is a cross-sectional view taken along line V-V in FIG. 4.

As illustrated in FIG. 5, a portion surrounded by the first side surface portion 21, the second side surface portion 22, the surface portion 23, and the back surface portion 24 serves as a linear housing path R1 that can house a plurality of electrodes 10. As illustrated in FIG. 1, an end of the housing path R1 has an electrode outlet port 20.

The bottom surface of the housing path R1 is constituted by a band-shaped flat bottom surface 2a extending in an extension direction of the housing path R1 and a pair of tilt surfaces 2b that gradually become apart from each other upward from both edges of the flat bottom surface 2a. The tilt surfaces 2b form an angle corresponding to tapered surfaces 10a at the front ends of the electrodes 10.

The housing path R1 can house the electrodes 10 in a state where the electrodes 10 are arranged linearly in a direction orthogonal to center axes C1 thereof and fitting recesses 10b to be fitted onto the distal end of the shank 11 are arranged in parallel and are open in the same direction.

A pair of upper and lower opposed projecting plate portions 21a extending in the longitudinal direction of the first side surface portion 21 and projecting in a direction away from the second side surface portion 22 is disposed near upper and lower edges of the first side surface portion 21 at one end. The horizontal width of each of the projecting plate portions 21a gradually decreases toward the end of the first side surface portion 21.

Figure 4:
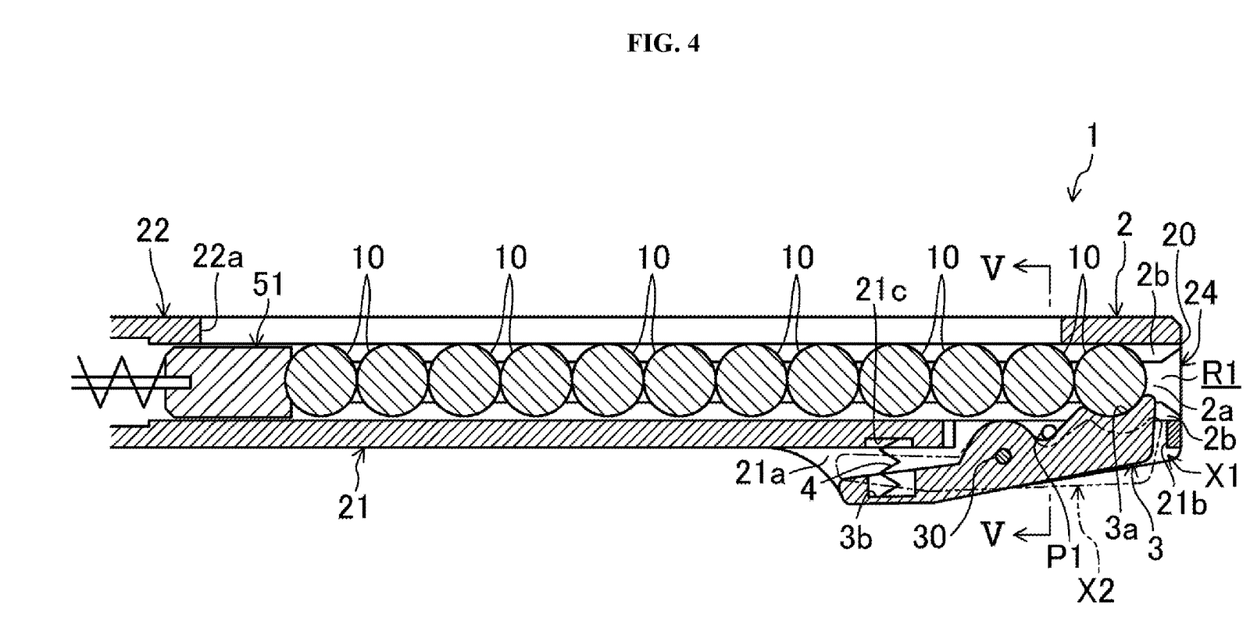
FIG. 4 is a cross-sectional view taken along line IV-IV in FIG. 2.
Figure 6:
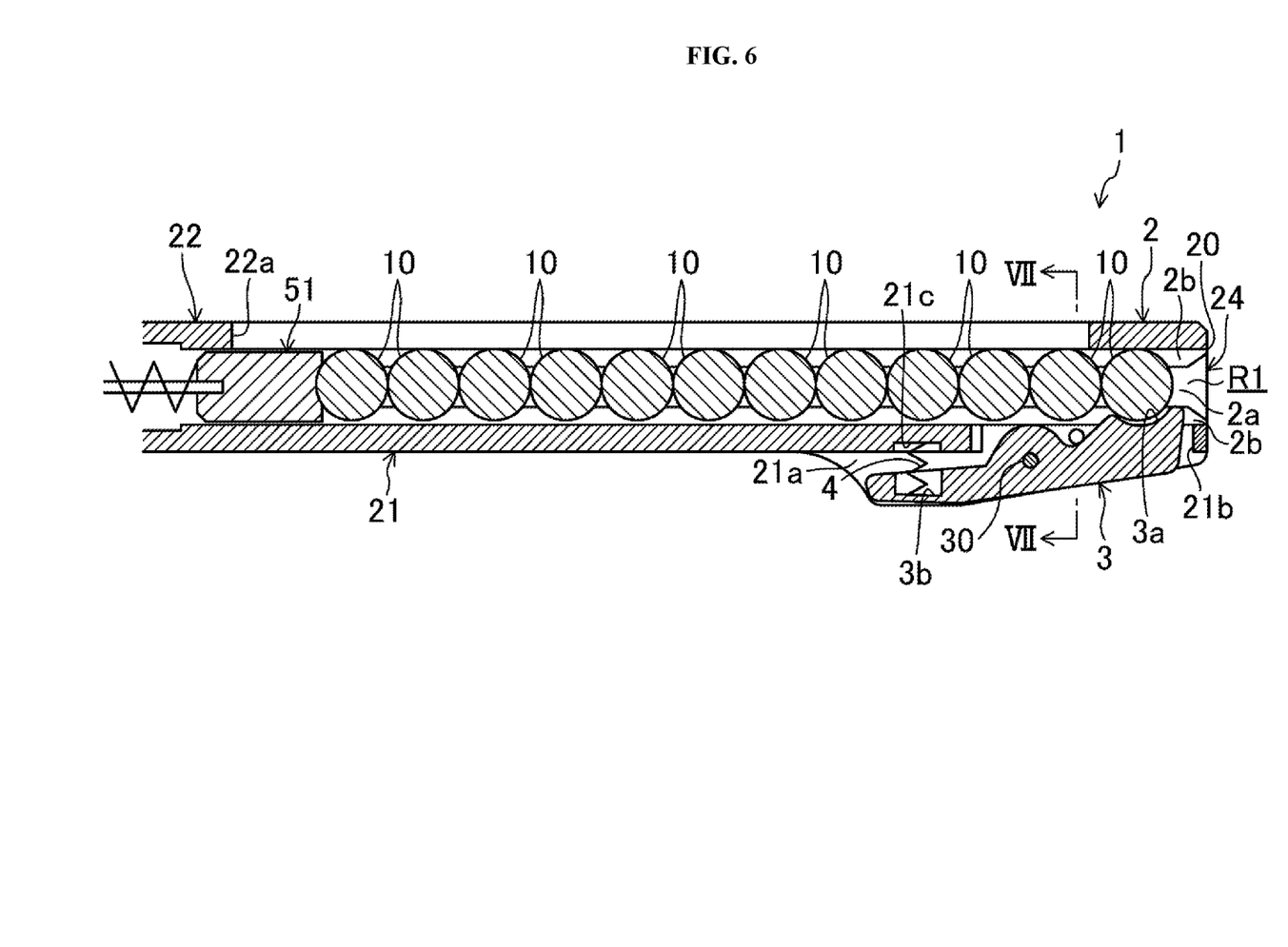
FIG. 6 is a view corresponding to FIG. 4 in a state where a lever member is in a position between a first position and a second position.
Figure 7:
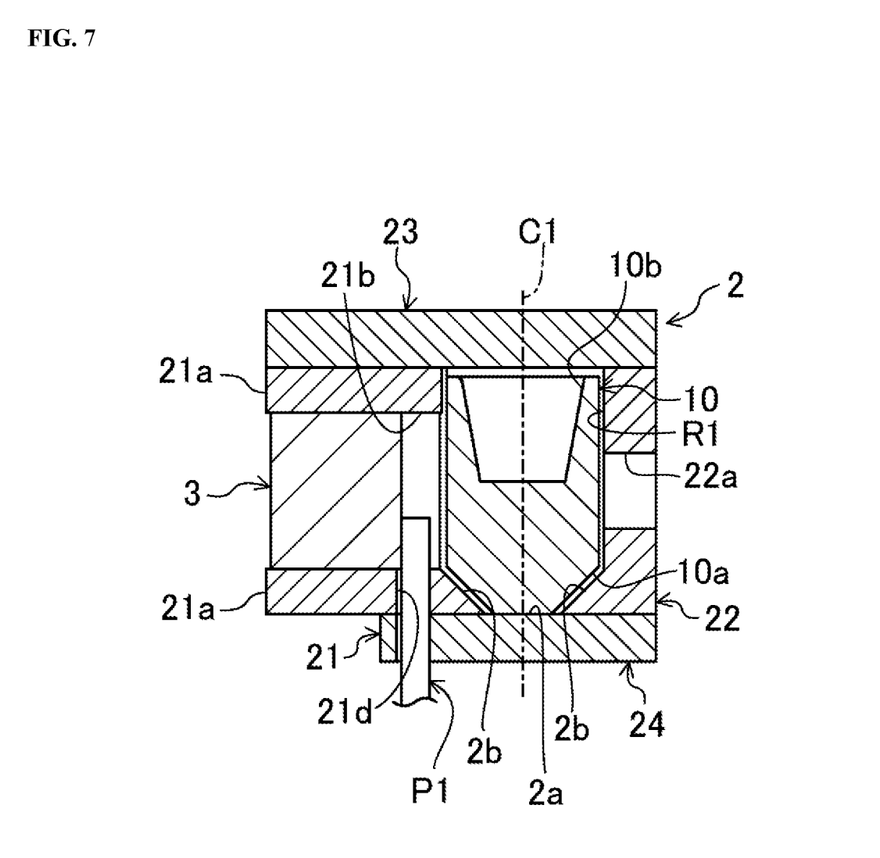
FIG. 7 is a cross-sectional view taken along line VII-VII in FIG. 6.

As illustrated in FIG. 4, a rectangular opening 21b communicating with the housing path R1 is formed between the projecting plate portions 21a of the first side surface portion 21. As illustrated in FIGS. 6 and 7, a pin insertion hole 21d in which a slender rod-shaped regulating pin P1 can be inserted is vertically formed through a center of a lower part of the first side surface portion 21 corresponding to the opening 21b.

As illustrated in FIG. 4, a shallow first housing recess 21c that is open at the opposite side of the second side surface portion 22 is formed at a position near an end of the first side surface portion 21.

As illustrated in FIGS. 4 and 5, a slit 22a extending linearly along the longitudinal direction of the second side surface portion 22 is formed in a vertically intermediate portion of the second side surface portion 22. The slit 22a communicates with the housing path R1.

As illustrated in FIG. 1, a shank entrance 23a is formed at a longitudinal end of the surface portion 23 as a notch that is open at the longitudinal end of the surface portion 23 and is continuous to the electrode outlet port 20.

As illustrated in FIG. 2, a positioning recess 23b is formed on the surface near the longitudinal end of the surface portion 23.

A first guide groove 24a and a second guide groove 24b extending in the horizontal direction orthogonal to the longitudinal direction of the back surface portion 24 are formed with a predetermined interval in the longitudinal direction of the back surface portion 24 at the longitudinal end of the lower surface of the back surface portion 24. The first guide groove 24a is narrower than the second guide groove 24b.

As illustrated in FIGS. 4 and 5, a lever member 3 extending toward an end of the housing case 2 is disposed between the projecting plate portions 21a.

A curved portion 3a corresponding to the outer peripheral surfaces of the electrodes 10 is formed at the side of the distal end of the lever member 3 facing the housing path R1, whereas a second housing recess 3b is formed at a position corresponding to the first housing recess 21c at the proximal end of the lever member 3.

An intermediate portion of the lever member 3 is supported by a swing shaft 30 extending in the same direction as the center axes C1 of the electrodes 10 housed in the housing path R1. The lever member 3 can swing about the swing shaft 30.

A first coil spring 4 is disposed between the proximal end of the lever member 3 and the first side surface portion 21.

An end of the first coil spring 4 is housed in the first housing recess 21c and the other end of the first coil spring 4 is housed in the second housing recess 3b. The first coil spring 4 biases the proximal end of the lever member 3 to the direction away from the housing case 2 so that the lever member 3 swings to one side.

When the lever member 3 swings to one side by a biasing force of the first coil spring 4, as illustrated in FIGS. 4 and 5, the distal end of the lever member 3 enters the housing path R1 through the opening 21b to be in a first position X1 in which the lever member 3 covers a part of the electrode outlet port 20 and the curved portion 3a pushes the electrodes 10 against the inner surface of the second side surface portion 22. On the other hand, when the lever member 3 swings to the other side against the biasing force of the first coil spring 4, as illustrated in FIGS. 6 and 7, the distal end of the lever member 3 moves away from the housing path R1 to be in a second position X2 in which the lever member 3 exposes the electrode outlet port 20 and the curved portion 3a moves away from the electrodes 10.

That is, the lever member 3 can change its position between the first position X1 in which ejection of the electrodes 10 from the electrode outlet port 20 is regulated and the second position X2 in which ejection of the electrodes 10 from the electrode outlet port 20 is allowed.

When the lever member 3 is caused to swing to one side, as illustrated in FIGS. 4 and 5, the distal end of the lever member 3 covers a part of the opening of the pin insertion hole 21d, whereas when the lever member 3 is caused to swing to the other side, as illustrated in FIGS. 6 and 7, the distal end of the lever member 3 moves to a position at which the distal end does not cover the opening of the pin insertion hole 21d.

When the lever member 3 is then caused to the other side against the biasing force of the first coil spring 4 and the regulating pin P1 is inserted in the pin insertion hole 21d from below, as illustrated in FIGS. 6 and 7, the regulating pin P1 regulates the lever member 3 to prevent the lever member 3 from swinging to one side in positions between the first position X1 and the second position X2.

Figure 3:
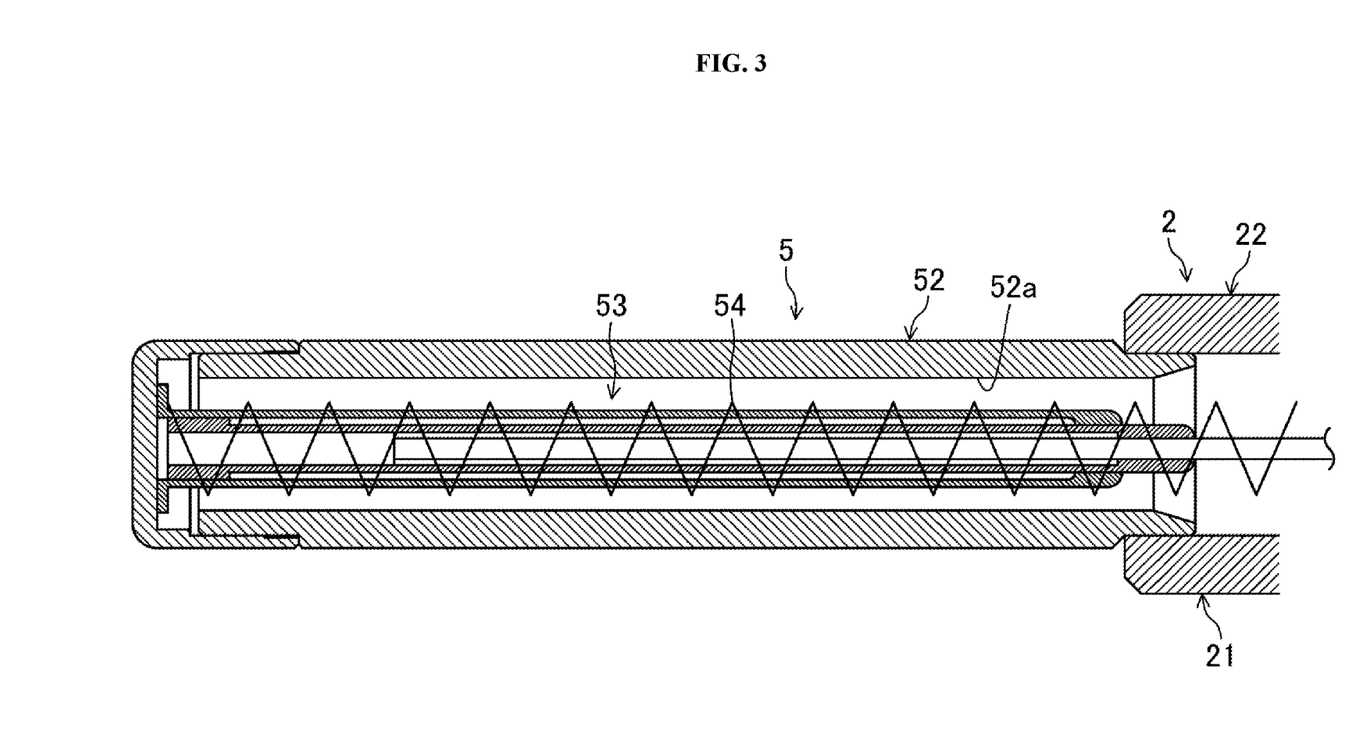
FIG. 3 is a cross-sectional view taken along line in FIG. 1.

As illustrated in FIGS. 3 and 4, a pressing unit 5 (pressing part) is disposed at the other longitudinal end of the housing case 2.

The pressing unit 5 includes a block-shaped pressing member 51 disposed in the housing path R1. The pressing member 51 can move forward and backward along the housing path R1.

The pressing unit 5 includes a bottomed cylindrical cover 52, and the rim of the opening of the cylindrical cover 52 is fixed to the other longitudinal end of the housing case 2.

A hollow portion 52a that is open to the housing case 2 is formed in the cylindrical cover 52. An extendable rod 53 constituted by a telescopic mechanism is disposed in the hollow portion 52a.

The distal end of the extendable rod 53 is fixed to a center portion of the rear end surface of the pressing member 51. When the pressing member 51 moves forward and backward, the extendable rod 53 extends or contracts along the housing path R1.

A second coil spring 54 is disposed in the hollow portion 52a of the cylindrical cover 52. The second coil spring 54 is wound around the extendable rod 53.

The second coil spring 54 has one end in contact with the rear end of the pressing member 51 and the other end in contact with the bottom surface of the cylindrical cover 52, and biases the pressing member 51 forward.

That is, the pressing unit 5 presses one or a plurality of electrodes 10 housed in the housing path R1 toward one end of the housing path R1.

As illustrated in FIG. 1, the housing case 2 is attached to one side surface of a tip dresser 7 (attachment object) through a bracket 6 having a U-shaped cross section.

The bracket 6 includes a fixed plate 61 to be fixed to the tip dresser 7 and an upper plate 62 and a lower plate 63 extending in parallel with each other from the upper and lower edges of the fixed plate 61 to move away from the tip dresser 7.

A portion surrounded by the fixed plate 61, the upper plate 62, and the lower plate 63 constitutes an attachment recessed portion 6a of the present invention. The housing case 2 can be attached to the attachment recessed portion 6a.

An index plunger 8 is attached to a portion of the upper plate 62 near a longitudinal end of the upper plate 62.

A surface of the lower plate 63 facing the upper plate 62 constitutes a guide surface 64 of the present invention.

As illustrated in FIG. 2, the guide surface 64 has a first rib 64a and a second rib 64b that can be fitted in the first guide groove 24a and the second guide groove 24b, respectively. The first rib 64a is narrower than the second rib 64b.

When the first guide groove 24a and the second guide groove 24b are matched with the first rib 64a and the second rib 64b, respectively, and the housing case 2 is moved along the guide surface 64 while the index plunger 8 is pulled up, the first rib 64a and the second rib 64b are fitted in the first guide groove 24a and the second guide groove 24b, respectively, so that the housing case 2 is attached to the attachment recessed portion 6a.

When the housing case 2 is attached to the attachment recessed portion 6a, the positioning recess 23b of the surface portion 23 matches with the index plunger 8. A pin 8a of the index plunger 8 is fitted in the positioning recess 23b to thereby fix the housing case 2 to the attachment recessed portion 6a. Thus, the process of attachment of the housing case 2 to the bracket 6 is easily performed, and the housing case 2 can be accurately positioned relative to the bracket 6.

The first guide groove 24a and the second guide groove 24b have different widths, and the first rib 64a and the second rib 64b have different widths. Thus, an error in attaching the housing case 2 to the attachment recessed portion 6a can be eliminated Next, ejection of the electrodes 10 from the electrode housing apparatus 1 will be specifically described.

First, a welding gun held by a welding robot is moved so that the distal end of the shank 11 of the welding gun is matched with the shank entrance 23a.

Next, the shank 11 of the welding gun is moved toward the shank entrance 23a. Accordingly, as illustrated in FIG. 5, the distal end of the shank 11 is fitted in the fitting recess 10b of the electrode 10 that is in contact with the lever member 3.

Thereafter, the welding gun is moved in such a manner that the electrode 10 mounted to the distal end of the shank 11 moves to an end of the housing path R1. Accordingly, the lever member 3 swings to the other side against a biasing force of the first coil spring 4 so that the electrode outlet port 20 is exposed, and the electrode 10 is ejected from the electrode outlet port 20.

When the electrode 10 mounted to the shank 11 passes through the electrode outlet port 20, other electrodes 10 arranged in parallel in the housing path R1 move toward one end of the housing path R1 by a spring force of the pressing unit 5.

Then, the lever member 3 swings to one side by the biasing force of the first coil spring 4 so that the curved portion 3a presses a next electrode 10 among the electrodes 10 against the inner surface of the second side surface portion 22, and the distal end of the lever member 3 covers a part of the electrode outlet port 20 so that the electrode 10 comes to be in an ejectable state.

Subsequently, housing of the electrodes 10 in the housing path R1 of the housing case 2 will be specifically described.

When the number of electrodes 10 housed in the housing path R1 of the housing case 2 becomes small, an operator causes the lever member 3 to swing to the other side against the biasing force of the first coil spring 4, and as illustrated in FIGS. 6 and 7, the regulating pin P1 is inserted in the pin insertion hole 21d from below. Accordingly, the regulating pin P1 regulates the lever member 3 to prevent the lever member 3 from swinging to one side in positions between the first position X1 and the second position X2.

Subsequently, the operator pushes unused electrodes 10 from the electrode outlet port 20 into the housing path R1 against the spring force of the pressing unit 5. Then, the distal end of the lever member 3 swings to the other side against the biasing force of the first coil spring 4 while slidably contacting the outer peripheral surfaces of the electrodes 10 that are being pushed in by the lever member 3 so that the electrode outlet port 20 is exposed. Accordingly, the electrodes 10 enter the housing path R1.

When the electrodes 10 enter the housing path R1, the distal end of the lever member 3 moves over the outer peripheral surfaces of the electrodes 10, and the lever member 3 swings to one side by the biasing force of the first coil spring 4 so that the curved portion 3a pushes the unused electrodes 10 against the inner surface of the second side surface portion 22.

In this manner, the process of pushing the electrodes 10 is repeatedly performed so that the plurality of electrodes 10 are housed in the housing path R1.

As described above, in the embodiment of the present invention, since the first coil spring 4 is located at a position of the lever member 3 facing the housing case 2, even if another equipment or tool contacts the electrode housing apparatus 1, this equipment or tool contacts the lever member 3 before contacting the first coil spring 4 as a movable member. This configuration can prevent a failure in moving the lever member 3 due to direct contact of this equipment or tool with the first coil spring 4.

In addition, since the first coil spring 4 is not located on the outer surface of the lever member 3, appearance of the entire electrode housing apparatus 1 can be enhanced, and the electrode housing apparatus 1 can have excellent design.

When the regulating pin P1 is inserted in the pin insertion hole 21d, the lever member 3 can be maintained in a state where the opening area of the electrode outlet port 20 is larger than the opening area of the electrode outlet port 20 while the lever member 3 is in the first position X1. Thus, when the operator manually houses unused electrodes 10 in the housing path R1 of the housing case 2 from the electrode outlet port 20, a load on fingers of the operator can be reduced, and thereby, housing of the electrodes 10 can be easily performed.

In addition, since the lever member 3 is sandwiched between the projecting plate portions 21a, even if another equipment or tool contacts the electrode housing apparatus 1, this equipment or tool contacts the projecting plate portions 21a before contacting the lever member 3. Accordingly, this configuration ensures prevention of a problem that another equipment or tool accidentally contacting the lever member 3 causes the lever member 3 to move to another side so that unused electrodes 10 in the housing path R1 are ejected from the electrode outlet port 20 by a spring force of the pressing unit 5.

Furthermore, since the first coil spring 4 is surrounded by the projecting plate portions 21a, occurrence of failures caused by attachment of foreign matter or the like to the first coil spring 4 can be reduced.

Moreover, when the first rib 64a and the second rib 64b of the bracket 6 are matched with the first guide groove 24a and the second guide groove 24b of the housing case 2 and the housing case 2 is moved along the first rib 64a and the second rib 64b, the first rib 64a and the second rib 64b are fitted in the first guide groove 24a and the second guide groove 24b, and the housing case 2 is attached to the attachment recessed portion 6a of the bracket 6. Thus, the process of attachment of the housing case 2 to the bracket 6 is easily performed, and the housing case 2 can be accurately positioned relative to the bracket 6.

In the embodiment of the present invention, the first guide groove 24a and the second guide groove 24b are formed on the housing case 2 and the first rib 64a and the second rib 64b to be respectively fitted in the first guide groove 24a and the second guide groove 24b are formed on the bracket 6. However, the present invention is not limited to this configuration. For example, the first guide groove 24a and the second guide groove 24b may be formed on the bracket 6, and the first rib 64a and the second rib 64b to be respectively fitted in the first guide groove 24a and the second guide groove 24b may be formed on the housing case 2.

The present invention is suitable for, for example, a spot welding electrode housing apparatus for housing electrodes for spot welding to be used in automobile manufacturing lines in a state where the electrodes can be mounted to a shank of a welding gun.

What is claimed is:

1. A spot welding electrode housing apparatus capable of housing a plurality of electrodes for spot welding, the spot welding electrode housing apparatus comprising:
   a housing case including a linear housing path therein and having an electrode outlet port, the housing path being capable of housing the electrodes in a state where the electrodes are arranged linearly in a direction orthogonal to center axes of the electrodes and fitting recesses of the electrodes to be fitted on a distal end of a shank of a welding gun are arranged in parallel and are open in an identical direction, the electrode outlet port communicating with the housing path and being disposed at an end of the housing case;

a pressing part that presses one or a plurality of parallel electrodes housed in the housing path toward an end of the housing path;

a lever member supported by the housing case to be swingable about a swing shaft extending in a direction identical to the center axes of the electrodes housed in the housing path, a position of the lever member being changeable between a first position in which the lever member swings to one side to have a distal end cover a part of the electrode outlet port and a second position in which the lever member swings to another side to have the distal end expose the electrode outlet port; and a biasing part disposed between a proximal end of the lever member and a side surface of the housing case and configured to bias the proximal end of the lever member to a direction away from the housing case so that the lever member swings to the one side.

2. The spot welding electrode housing apparatus of claim 1, wherein the housing case has a pin insertion hole in which a regulating pin is insertable, and the regulating pin is configured to prevent the lever member from swinging to the one side in a position between the first and second positions.

3. The spot welding electrode housing apparatus of claim 1 or 2, wherein a pair of projecting plate portions opposed to each other in a direction along the swing shaft and extending along the housing case is formed in a side surface of the housing case at one end, and the lever member is disposed between the pair of projecting plate portions.

4. The spot welding electrode housing apparatus of claim 1, wherein a bracket for attaching the housing case to an attachment object, wherein the bracket has an attachment recessed portion to which the housing case is attachable, the attachment recessed portion has a guide surface for guiding the housing case in attaching the housing case, one of the guide surface or the housing case has a guide groove extending along a direction of attachment of the housing case to the attachment recessed portion, and the other one of the guide surface or the housing case has a rib capable of being fitted in the guide groove.

* * * * *